Oct. 13, 1970    J. F. McCREERY    3,533,312
CLAMPING DEVICE
Filed Aug. 21, 1968    2 Sheets-Sheet 1
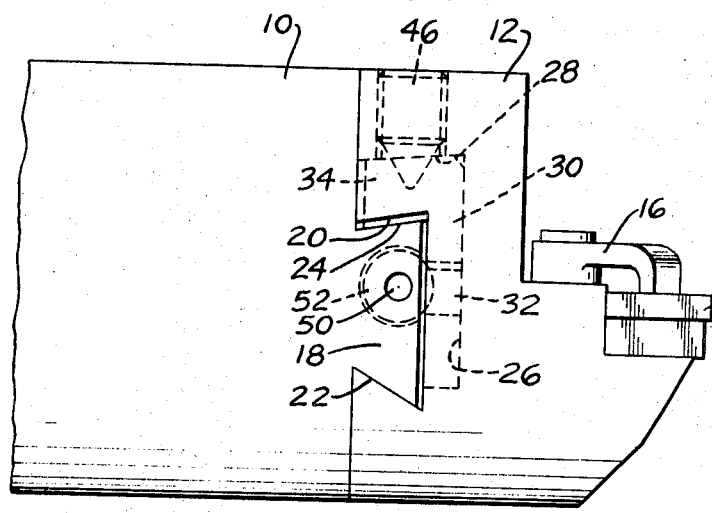
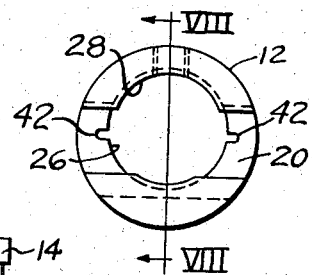
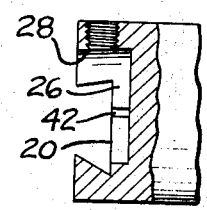
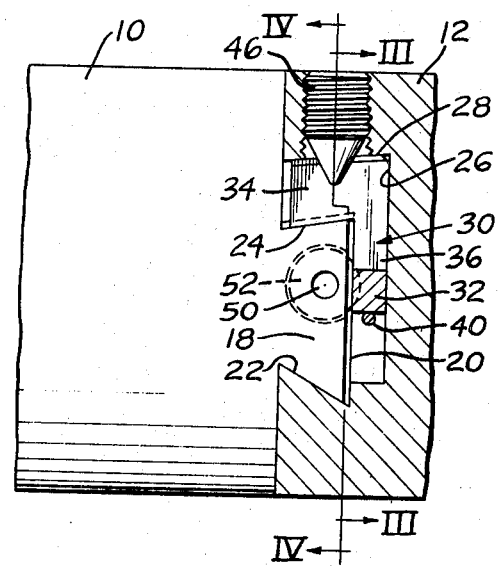
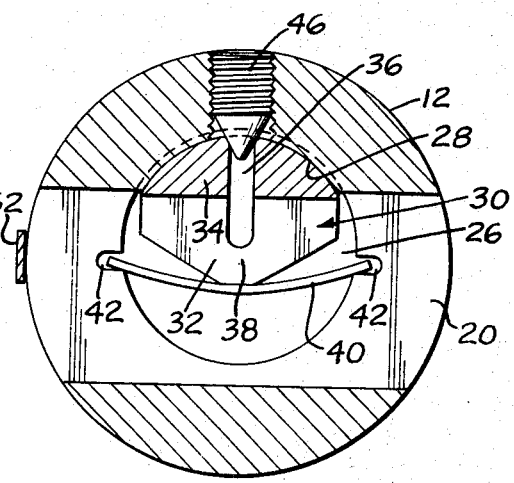
INVENTOR
JAMES F. McCREERY Oct. 13, 1970    J. F. McCREERY    3,533,312
CLAMPING DEVICE
Filed Aug. 21, 1968    2 Sheets-Sheet 2
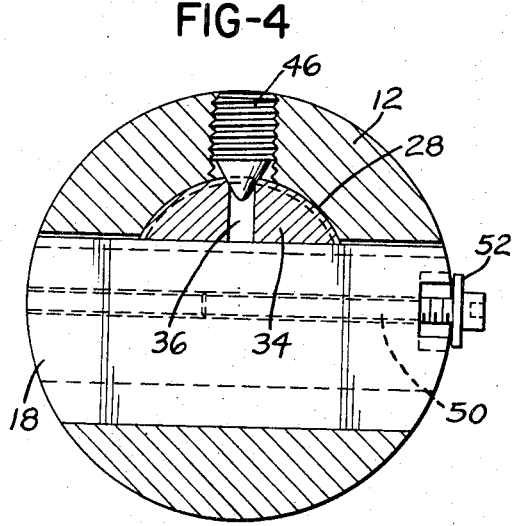
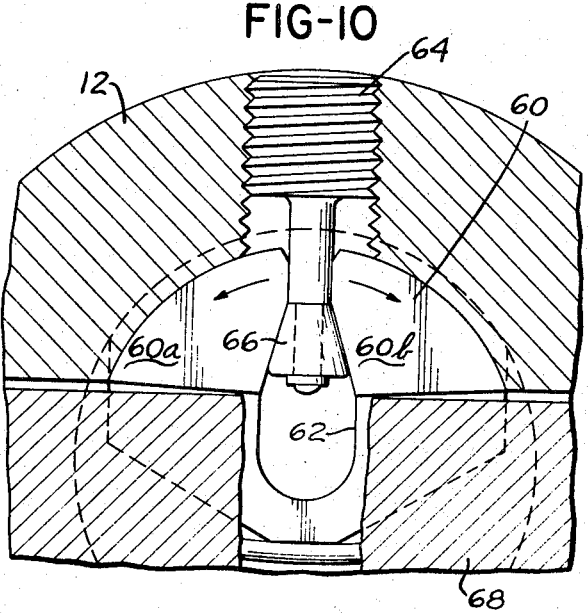
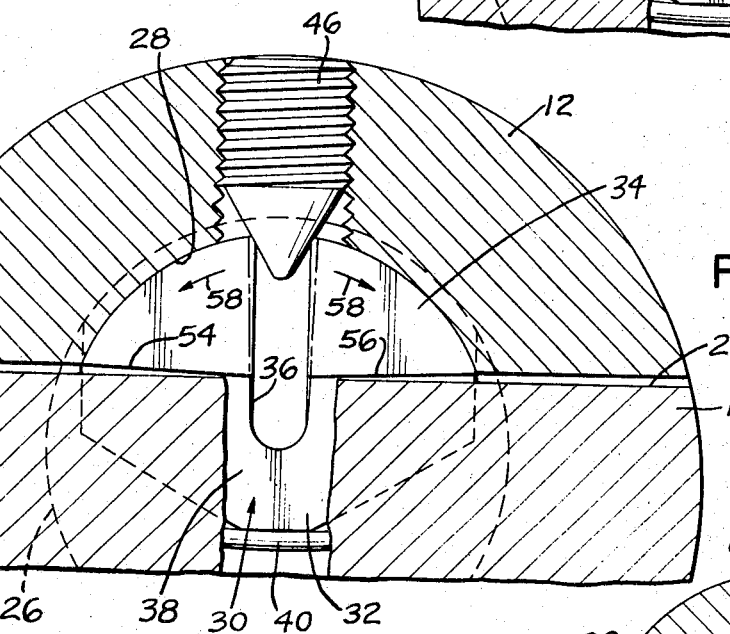
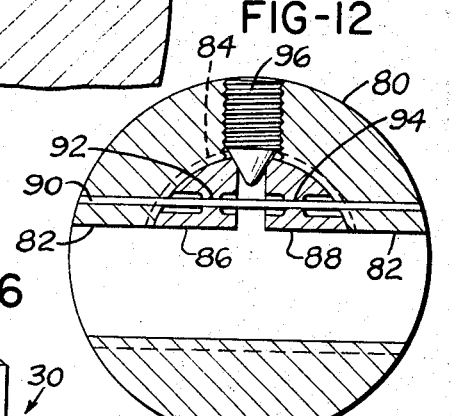
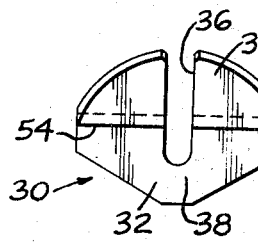
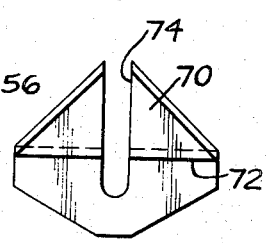
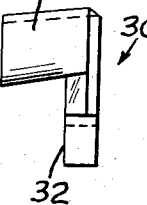
INVENTOR
JAMES F. McCREERY
BY
Melvin A. Crosley

United States Patent Office 3,533,312
Patented Oct. 13, 1970

3,533,312
CLAMPING DEVICE
James F. McCreery, Greensburg, Pa., assignor to Kennametal Inc., Latrobe, Pa., a corporation of Pennsylvania
Filed Aug. 21, 1968, Ser. No. 754,250
Int. Cl. B23b 29/03
U.S. Cl. 77—58     10 Claims

ABSTRACT OF THE DISCLOSURE

This application relates to the attachment of an adjustable head member to the shank member of a boring bar by a dovetail with a clamp element to clamp the head and shank member together which spreads laterally when tightened into wedging clamping engagement to prevent shifting of the head member on the shank member.

---

Boring bars with adjustable heads mounted thereon are, of course, well known and are widely used in connection with machining of work members. A particular problem that has always existed in connection with such boring bars is the provision of a connection of the adjustable head of the boring bar to the shank or support member of the boring bar which will permit fine adjustment on the head on the shank and will then permit rigid clamping of the head to the shank without the clamping operation tending to shift the head on the shank and thus destroying the accuracy of the adjustment thereof.

With the foregoing in mind, it is a particular object of the present invention to provide a connecting arrangement for connecting two members together, for example, an adjustable boring head to the shank of a boring bar, which will tightly and accurately hold the head on the boring bar shank and which will not tend to shift the head on the shank during the clamping of the head in place on the shank.

A still further object is the provision of an arrangement of the nature referred to which is relatively easy to manufacture and which is essentially trouble-free in operation.

A still further object is the provision of an arrangement of the nature referred to in which the two members, for example, the adjustable head and shank of a boring bar, are tightly drawn toward each other by the act of clamping the head in place on the shank.

The several objects and advantages referred to above, as well as still other objects and advantages of the present invention, will become more apparent upon reference to the following specification, taken in connection with the accompanying drawings in which:

FIG. 1 is a side elevational view of the head end of a boring bar having a connecting arrangement according to the present invention;

FIG. 2 is a view looking in at the boring bar in the same manner as in FIG. 1 but with the head portion of the boring bar broken away and shown in section to illustrate parts inside the boring bar head;

FIG. 3 is a vertical sectional view indicated by III—III on FIG. 2;

FIG. 4 is a vertical sectional view indicated by line IV—IV on FIG. 2;

FIG. 5 is an elevational view showing a clamping wedge member forming an important part of the present invention;

FIG. 6 is a view of the wedge member looking in from the right side of FIG. 5;

FIG. 7 is an elevational view looking in at the head of the boring bar from the shank side thereof and with all internal parts removed therefrom;

FIG. 8 is a vertical section indicated by line VIII—VIII on FIG. 7 showing the configuration of a cavity formed in the head member;

FIG. 9 is an enlarged transverse sectional view showing the manner of operation of the clamping device according to the present invention, somewhat exaggerated with respect to certain details purely for illustrative purposes;

FIG. 10 is a sectional view like FIG. 9 but shows a modification;

FIG. 11 is a view like FIG. 5 but shows a modified form which the clamp element can take; and FIG. 12 is a sectional view similar to FIG. 3 but shows a modified arrangement wherein the clamp member is made up of two individual elements.

Referring to the drawings in somewhat more detail, FIG. 1 illustrates a boring bar having a shank 10 and an adjustable head 12 secured to the shank by the clamp arrangements of the present invention. Head 12 carries a replaceable cutting insert 14 of, for example, cemented tungsten carbide, and which cutting insert is fixedly clamped in place by some sort of clamping means such as the clamp 16.

As will be seen, shank 10 is provided with a dovetail or tenon portion 18 projecting therefrom which extends into a dovetail groove 20 formed in the adjacent side of head 12. Dovetail or tenon 18 of shank 10 has a conventional angle on one side 22 and this side of the dovetail or tenon engages the adjacent side of the groove 20 in head 10. On the other side of the dovetail or tenon, at 24, the angular formation thereof is inclined to a small degree relative to the axis of shank 10 and, furthermore, this side of the dovetail or tenon is spaced for the adjacent side of groove 20 in the head 12.

As will best be seen in FIGS. 2, 3, and 4, the head 12, on the side thereof facing the end of shank 10, is provided with a cavity 26 in which is disposed a clamping member 30. The cavity 26 extends laterally into the head 12 on one side of the groove 20 and has a wall 28 which is concave toward the side of the groove and is thus also concave toward side 24 of the dovetail or tenon formed on the end of shank 10. Wall 28 is also inclined relative to the longitudinal axis of shank 10 but to a lesser degree than sidewall 24 of the tenon on the end of shank 10.

The cavity 26, as will best be seen in FIG. 3, is substantially circular and is adapted for receiving a clamp member 30 having a thin back portion 32 disposed in the recess 26 beyond the end of the tenon on the end of shank 10, and a thicker portion 34 that engages wall 28 and extends toward the tenon and overlies sidewall 24 of the tenon. Portion 34 of member 30 on its outer side is inclined at the same angle as wall 28 of the recess and on its other side is inclined at the same angle as sidewall 24 of tenon 18.

As will be seen in FIG. 3, clamp member 30 is provided with a substantially radial central slot 36 extending from the outer periphery of the clamp member a substantial distance therethrough so as to define a region 38 at the bottom of part 32 of the clamp member which will be somewhat resilient and which will permit the outer portion 34 of the clamp member, which is divided by slot 36, to spread somewhat. The clamp member is held in place as by a spring wire 40 having its ends disposed in recesses 42 at the sides of cavity 26 and having its intermediate portion resiliently engaging the bottom edge of part 32 of clamp member 30.

Carried in the head is a cone-pointed set screw 46 which has its cone point engaging the open outer end of slot 36. It will be apparent that adjustment of screw 46 in the inward direction will drive the cone point thereof inwardly of slot 36 and this will tend to move the entire clamp member inwardly in cavity 26. The clamp member, however, will engage sidewall 24 of tenon 18 and will be prevented from moving inwardly in cavity 26 so that inward movement of screw 46 will cause the two side portions of the clamp member to move away from each other and be guided by the arcuate wall 28 of the cavity in the head into clamping engagement with tenon 18. Due to the inclination of walls 24 and 28, simultaneously with the clamping of the head to the tenon, the head will be drawn tightly against the end of the shank. A particular feature of the clamping arrangement illustrated is that it does not impart any lateral forces on the head so that, once the head is adjusted to a pre-determined position, the clamp can be tightened up and the head will remain precisely in the same position. It has not been found possible to effect such clamping without shifting by the use of set screws or any other conventional clamping means of a well known nature. With the clamping arrangement illustrated in the present invention, however, has been found that there is not even a slight amount of shifting of the head from its adjusted position.

Adjusting of the head on the shank can be accomplished by any of several well known expedients. The head can be, for example, adjusted by the use of a screw 50 threaded into the tenon 18 and having a head or flange portion 52 extending radially over the head so that the screw can be turned to move the head lengthwise of the tenon to an adjusted position thereon.

FIG. 9 shows at considerably enlarged scale what occurs when clamp screw 46 is tightened up. It will be noted in FIG. 9 that the underneath clamping surfaces 54 and 56 of the two parts of clamp member 30 are inclined somewhat upwardly in a direction outwardly from the center of the clamp member. This slight amount of upward tilt permits lateral movement of the two parts of the clamp member, as shown by the arrows 58 in FIG. 9 so that the two parts of the clamp member are driven like wedges in respectively opposite directions into tight clamping engagement with surface 24 of tenon 18 of the shank of the boring bar.

Due to the fact that a wedgelike action occurs during clamping, it is also possible to form the clamp member as shown at 60 in FIG. 10 so that the central slot 62 thereof tapers inwardly toward the outer periphery of the clamp member. This type of construction can be availed of for receiving a set screw 64 having an inverted conical end at 66 which, when the screw is backed upwardly of the head, will cause the two parts 60a and 60b of clamp member 60 to move laterally relative to each other and to be wedged into clamping engagement with tenon 68 of the shank of the boring bar.

By forming the cavity in the head to a different configuration it is possible to use clamp members of a different configuration, for example, such as is shown in FIG. 11 wherein the clamp member 70 illustrated therein is substantially triangular above the surface 72 thereof which is to engage the sidewall of the tenon. The clamp member has a central slot 74 and is adapted for being spread laterally by a cone pointed screw or the like. In the case of the clamp member of FIG. 11, the two walls of the cavity in the head leading away from the set screw location would be inclined at about the same angle as the two sides of the clamp member as it is viewed in FIG. 11, the same angles in longitudinal section pertaining for both the clamp member and the cavity as were described in connection with the first modification.

The clamp member can also be formed of two independent parts as shown in FIG. 12. In FIG. 12, instead of a cavity extending axially into the head, the head 80 is formed with a dovetail groove 82 and into one side thereof, and at about the same depth as the depth of the dovetail groove, there is an arcuate cavity 84. Disposed in this arcuate cavity are two clamp elements 86 and 88, which conform with the shape of the portions 34 of the clamp member first described, and which elements are not connected by any depending portion integral therewith. Instead, a spring wire 90 is extended through the head and traverses the cavity in which the elements 86 and 88 are located and is connected with the respective elements as at 92 and 94 in such a manner that the elements are free to move in the cavity and relative to each other under the influence of the cone pointed screw 96. The connection of the wire with the individual elements may be accomplished, for example, by providing a hole in each element for the wire to pass through the elements and then counterboring the holes from the opposite sides of the elements so that the elements will be flexibly supported by the spring wire.

In the case of every modification illustrated and described, the common feature of the wedging action of the clamp elements is present so that each modification illustrated will accomplish extremely tight and rigid clamping of the head to the bar without any lateral shifting of the head on the bar due to the clamping operation.

All of the modifications are relatively inexpensive to manufacture and have long life and a wide range of adjustability and are simple to keep in good operating condition.

It is to be understood that the connecting and clamping arrangement of the present invention is not limited in use to the connecting of a head member to the shank member of a boring bar. This particular work member has been shown as exemplary and one in which the arrangement has particular merit.

It will be understood that the present invention is susceptible to modification in order to adapt it to different usages and conditions and, accordingly, it is desired to comprehend such modifications of this invention as may fall within the scope of the appended claims.

What is claimed is:

1. In a clamping structure; a first member having a dovetail tenon thereon, a second member having a dovetail groove therein to receive said tenon and having one side engaging one side of said tenon, the other side of said groove being spaced from the other side of said tenon, a cavity in said second member extending laterally therein from said other side of said groove and having a wall concave toward said tenon, clamp means in said cavity having an outer side engaging said wall of said cavity and an inner side formed parallel to and adapted to engage said other side of said tenon, said wall of said cavity and the outer side of said clamp means being inclined outwardly in a direction away from said tenon, said clamp means comprising two parts spaced in the direction of the length of the tenon, and actuating means carried by said second member engaging the said parts on the sides thereof which are adjacent each other and operable upon adjustment thereof on said second member to force said parts of said clamp means away from each other whereby said parts are guided by said wall of said cavity into clamping engagement with said other side of said tenon.

2. A clamp structure according to claim 1 in which said outer side of said clamp means conforms in shape to the shape of said wall of said cavity and is divided into the said parts thereof by a slot disposed in a plane perpendicular to the length of said tenon and about midway between the ends of said clamp means.

3. A clamp structure according to claim 2 in which said walls of said cavity is substantially circular and said clamp means is substantially semicircular, and the said slot therein is a substantially central radial slot.

4. A clamp structure according to claim 2 in which said actuating means comprises a screw threaded into said second member and having a cone point thereon engaging said parts on opposite sides of said slot at the outer end thereof remote from said tenon so that inward adjustment of said screw will force said parts toward said tenon and away from each other.

5. A clamp structure according to claim 2 in which said slot tapers inwardly toward the outer end thereof and said actuating means is a screw threaded into said second member and having means at the inner end wedge shaped in cross section and engaging said slot so that outward adjustment of said screw in said second member will force said parts away from each other.

6. A clamp structure according to claim 2 in which said parts are substantially triangular.

7. A clamp structure according to claim 2 in which said cavity extends into said second member in a direction away from said first member to leave a clearance at the outer side of said tenon, said clamp means having a portion projecting into said clearance, said slot terminating short to the innermost limit of said portion of said clamp means so that said parts are integrally united while being moveable laterally relative to each other.

8. A clamp structure according to claim 7 in which said second member includes a spring engaging said clamp means and urging it toward said wall of said cavity.

9. A clamp structure according to claim 1 in which spring means carried by second member engages the said parts of said clamp means and urges said parts toward said wall of said cavity.

10. A clamp structure according to claim 1 in which said parts of said clamp means are independent of each other, a spring wire carried by said second member and extending through said cavity and also through said parts, each said part being connected to said spring wire in about the middle of the respective part and having freedom of movement relative to the spring wire at the sides of the respective part so the parts can move and tilit in said cavity during clamping and unclamping operations.

References Cited

UNITED STATES PATENTS

| | | | |
|---|---|---|---|
| 2,029,458 | 2/1936 | Berg | 77—58 |
| 2,863,210 | 12/1958 | Tucker | 29—105 |
| 3,433,104 | 3/1969 | Milewski et al. | 77—58 |
| 3,064,503 | 11/1962 | Fry | 77—58 |

GERALD A. DOST, Primary Examiner

U.S. Cl. X.R.

82—36